US012118951B2

(12) United States Patent
Iazikov et al.

(10) Patent No.: US 12,118,951 B2
(45) **Date of Patent: *Oct. 15, 2024**

(54) DISPLAY SYSTEM WITH OPTICAL DEVICE

(71) Applicant: II-VI Delaware, Inc., Wilmington, DE (US)

(72) Inventors: Dmitri Iazikov, Eugene, OR (US); Anna Tatarczak, Felton, CA (US); Julien Boucart, Zurich (CH); Young-Kai Chen, Berkeley Heights, NJ (US)

(73) Assignee: II-VI DELAWARE, INC., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/113,511

(22) Filed: Feb. 23, 2023

(65) Prior Publication Data

US 2024/0290291 A1 Aug. 29, 2024

Related U.S. Application Data

(63) Continuation of application No. 18/097,797, filed on Jan. 17, 2023.

(Continued)

(51) Int. Cl.
*G09G 3/34* (2006.01)
*G09G 3/3208* (2016.01)

(52) U.S. Cl.
CPC ......... *G09G 3/3473* (2013.01); *G09G 3/3208* (2013.01); *G09G 2300/023* (2013.01)

(58) Field of Classification Search
CPC ............... G09G 3/3473; G09G 3/3208; G09G 2300/023
See application file for complete search history.

(56) References Cited

U.S. PATENT DOCUMENTS 6,823,115 B2 11/2004 Greiner et al.
6,993,223 B2 1/2006 Greiner et al.
(Continued)

FOREIGN PATENT DOCUMENTS

CN 102918435 A * 2/2013 ............. F21K 9/232
CN 111386495 A * 7/2020 ......... G02B 27/0172
(Continued)

OTHER PUBLICATIONS

Japanese Office Action for Application No. 2023-127597, mailed Jul. 2, 2024, 12 pages.

*Primary Examiner* — Ricardo Osorio
(74) *Attorney, Agent, or Firm* — McAndrews, Held & Malloy, Ltd.

(57) ABSTRACT

A display system includes a display screen layer, a coupling region, an upper guide, a first coupler, a second coupler, and an optical element. The coupling region may be positioned along a sidewall of the display screen layer and may route a beam between the optical element and the upper guide and may route the beam between the first coupler and the second coupler. The first coupler may be positioned along a front surface of the upper guide and may couple a beam through the front surface of the upper guide. The second coupler may be positioned between the coupling region and the upper guide and may couple the beam between the coupling region and the upper guide. The optical element may be positioned below a back surface of the upper guide. A computing device with the display system is also disclosed.

20 Claims, 7 Drawing Sheets

Related U.S. Application Data

(60) Provisional application No. 63/398,639, filed on Aug. 17, 2022.

(56) References Cited

U.S. PATENT DOCUMENTS

| | | | | |
|---|---|---|---|---|
| 7,120,334 | B1 | 10/2006 | Greiner et al. | |
| 7,190,859 | B2 | 3/2007 | Greiner et al. | |
| 7,203,401 | B2 | 4/2007 | Mossberg et al. | |
| 7,333,692 | B1 | 2/2008 | Mossberg et al. | |
| 7,359,597 | B1 | 4/2008 | Iazikov et al. | |
| RE41,570 | E | 8/2010 | Greiner et al. | |
| RE43,226 | E | 3/2012 | Iazikov et al. | |
| 11,294,107 | B2 | 4/2022 | Greiner et al. | |
| 11,662,525 | B1 * | 5/2023 | Hsieh | G02B 6/124 385/37 |
| 2017/0109561 | A1 | 4/2017 | Wyrwas et al. | |
| 2017/0276940 | A1 * | 9/2017 | Popovich | G02B 27/01 |
| 2019/0129175 | A1 * | 5/2019 | Amitai | G02B 6/00 |
| 2022/0075196 | A1 * | 3/2022 | Waldern | G03H 1/0248 |
| 2022/0317627 | A1 * | 10/2022 | Wang | G09G 3/001 |
| 2022/0344907 | A1 * | 10/2022 | Shi | H04B 10/116 |
| 2024/0019632 | A1 | 1/2024 | Chen | |
| 2024/0077742 | A1 * | 3/2024 | Popovich | G02B 6/0035 |

FOREIGN PATENT DOCUMENTS

| | | | | |
|---|---|---|---|---|
| JP | 2007219106 | | | 8/2007 |
| JP | 2009042870 | | | 2/2009 |
| JP | 2019049716 | | | 3/2019 |
| KR | 20160022855 | A | * | 3/2016 |
| KR | 20220138046 | A | * | 10/2022 |

* cited by examiner

DISPLAY SYSTEM WITH OPTICAL DEVICE

BACKGROUND

Computing devices (e.g., cellphones, tablets, laptops, desktops, etc.) may include display screens with an integrated optical device. The computing devices may use transmitters and/or receivers of the optical device for facial recognition, time-of-flight 3D sensing, structured light 3D sensing, etc. To this end, the transmitter of the optical device may include a flood illuminator for facial recognition, illuminators for time-of-flight 3D sensing, dot projectors for structured light 3D sensing, etc. Moreover, the receiver of the optical device may include a camera (e.g., a red-green-blue (RBG) sensor), an infrared (IR) sensor, etc. to receive signals transmitted by the transmitter. Currently such transmitters and receivers are incorporated into a separate area of a display screen, which reduces the usable area for the display screen to present images. For example, a cellphone may place the transmitter and receiver of an optical device in a bevel or notch at top of an OLED screen. Similarly, a laptop may place the transmitter and receiver of the optical device in a bevel or notch at a top of an LED screen. Such bevels or notches increase the overall size of the computing device and/or reduce the useable area of the display screen.

BRIEF SUMMARY OF THE DISCLOSURE

Shown in and/or described in connection with at least one of the figures, and set forth more completely in the claims is an optical device that comprises a transmitter and a receiver located behind a display screen. Placement of the transmitter and/or receiver behind the display screen may permit embodiments in which bevels or notches are reduced and/or eliminated in comparison to conventional placement of the transmitter and/or receiver.

These and other advantages, aspects and novel features of the present disclosure, as well as details of illustrated embodiments thereof, will be more fully understood from the following description and drawings.

BRIEF DESCRIPTION OF THE DRAWINGS

Various features and advantages of the present disclosure may be more readily understood with reference to the following detailed description taken in conjunction with the accompanying drawings, wherein like reference numerals designate like structural elements.

DESCRIPTION

Figure 1:
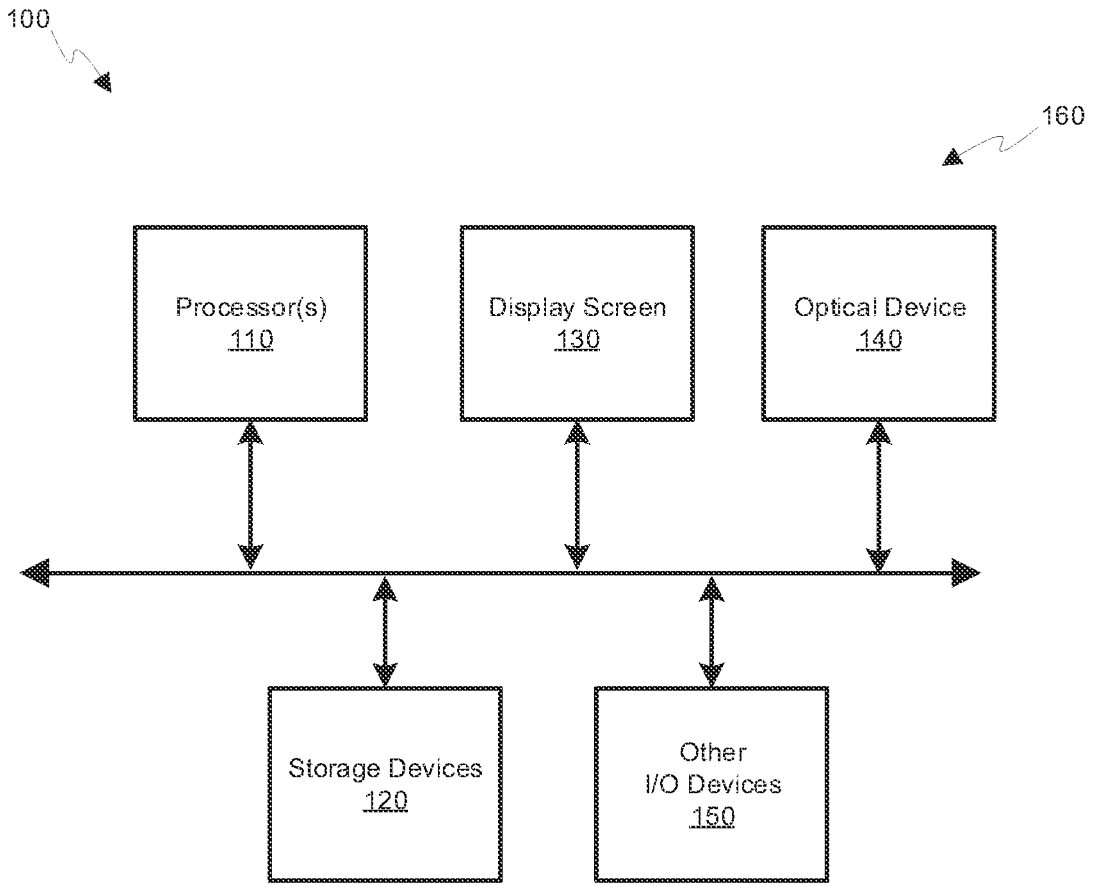
FIG. 1 depicts a block diagram of a computing device comprising a display system comprising an optical device and a display screen.

The following discussion provides various examples of optical devices and various examples of computing devices with optical devices. Such examples are non-limiting, and the scope of the appended claims should not be limited to the particular examples disclosed. In the following discussion, the terms "example" and "e.g." are non-limiting.

The figures illustrate the general manner of construction, and descriptions and details of well-known features and techniques may be omitted to avoid unnecessarily obscuring the present disclosure. In addition, elements in the drawing figures are not necessarily drawn to scale. For example, the dimensions of some of the elements in the figures may be exaggerated relative to other elements to help improve understanding of the examples discussed in the present disclosure. The same reference numerals in different figures denote the same elements.

The term "or" means any one or more of the items in the list joined by "or". As an example, "x or y" means any element of the three-element set {(x), (y), (x, y)}. As another example, "x, y, or z" means any element of the seven-element set {(x), (y), (z), (x, y), (x, z), (y, z), (x, y, z)}.

The terms "comprises," "comprising," "includes," and/or "including," are "open ended" terms and specify the presence of stated features, but do not preclude the presence or addition of one or more other features.

The terms "first," "second," etc. may be used herein to describe various elements, and these elements should not be limited by these terms. These terms are only used to distinguish one element from another. Thus, for example, a first element discussed in this disclosure could be termed a second element without departing from the teachings of the present disclosure.

Unless specified otherwise, the term "coupled" may be used to describe two elements directly contacting each other or describe two elements indirectly connected by one or more other elements. For example, if element A is coupled to element B, then element A can be directly contacting element B or indirectly connected to element B by an intervening element C. Similarly, the terms "over" or "on" may be used to describe two elements directly contacting each other or describe two elements indirectly connected by one or more other elements.

Generally, aspects of the present disclosure are directed to an optical device which may eliminate or reduce bevel(s) and/or notches used to accommodate a conventional optical device. In various embodiments, the optical device may include a transmitter and a receiver positioned behind a display screen of a computing device. Moreover, the optical device may include a guide (e.g., a waveguide, light guide, etc.) that routes or guides light received to the receiver located behind the display screen. Similarly, the same guide, another guide, and/or portions of the same guide may route or guide light generated by the transmitter located behind the screen.

Referring to FIG. 1, a block diagram of a computing device 100 is shown that includes a display system 160 with a display screen 130 and an optical device 140. As explained in greater detail below, aspects of the optical device 140 may be positioned behind and/or integrated with the display screen 130. Such positioning and/or integration may increase a useable display area of the display screen 130.

As shown, the computing device 100 may include one or more processors 110, one or more storage devices 120, the display screen 130, the optical device 140, and various input/output (I/O) devices 150. The computing device 100 may further include buses and/or other interconnects that operatively couple the processor(s) 110, storage device(s) 120, display screen 130, optical device 140, and I/O device(s) 150 to one another. A processor 110 may be configured to execute instructions, manipulate data, and control operation of other components of the computing device 100 as a result of executing such instructions. To this end, the processors 110 may include a general purpose processor such as, for example, an x86 processor, an ARM processor, etc., which are available from various vendors. However, the processor 110 may also be implemented using an application specific processor and/or other analog and/or digital logic circuitry.

The storage devices 120 may include one or more volatile storage devices and/or one or more non-volatile storage devices. In general, a storage device 120 may store software and/or firmware instructions, which may be executed by a processor 110. The storage devices 120 may further store various types of data which the processor 110 may access, modify, and/otherwise manipulate in response to executing instructions. To this end, the storage device 120 may include random access memory (RAM) device(s), read only memory (ROM) device(s), sold state device (SSD) drive(s), flash memory device(s), etc. In some embodiments, one or more devices of the storage devices 120 may be integrated with one or more processors 110.

The display screen 130 may include one or more display screen layers configured to present images and/or other visual output via front surfaces of such layers. In particular, the display screen 130 may present such images in response to the processor 110 executing instructions. To this end, the display screen 130 may include one or more liquid-crystal display (LCD) layers, liquid-crystal on silicon (LCoS) layers, light-emitting diode (LED) layers, organic light-emitting diode (OLED) layers, quantum dot layers, interferometric modulator layers, or other display screen layers.

As explained in greater detail below, the optical device 140 may include an optical element such as a transmitter and/or a receiver that emit and/or receive light. The computing device 100 may use transmitting and/or receiving of light to generate data as part of a facial recognition process, a biometric authentication process, an augmented reality process, an autofocusing process, and/or another process. In particular, the processor 110 may execute instructions of an operating system, device driver, application, and/or some other software and/or firmware module resulting in the generation of control signals that adjust operation of the optical device 140 and its optical elements.

The other I/O devices 150 may provide devices which enable a user or another device (e.g., another computing device, networking device, etc.) to interact with the computing device 100. For example, the I/O devices 150 may include buttons, touch screens, keyboards, microphones, audio speakers, etc. via which a person may interact with the computing device 100. The I/O devices 150 may also include network interfaces that permit the computing device 100 to communicate with other computing devices and/or networking devices. To this end, the networking interfaces may include a wired networking interface such as an Ethernet (IEEE 802.3) interface; a wireless networking interface such as a WiFi (IEEE 802.11) interface, BlueTooth (IEEE 802.15.1) interface; a radio or mobile interface such as a cellular interface (GSM, CDMA, LTE, etc.), and/or some other type of networking interface capable of providing a communications link between the computing device 100 and another computing device and/or networking device.

The above describes aspects of the computing device 100. However, there may be significant variation in actual implementations of the computing device 100. For example, a smart phone implementation of the computing device 100 may use vastly different components and may have a vastly different architecture than a laptop implementation of the computing device 100. Despite such differences, computing devices still generally include processors that execute software and/or firmware instructions in order to implement various functionality. As such, the above described aspects of the computing device 100 are not presented from a limiting standpoint but from a generally illustrative standpoint.

Certain aspects of the present disclosure may be especially useful for computing devices implemented as mobile consumer electronic devices (e.g., smartphones, tablets, laptops, etc.). However, the present disclosure envisions that aspects will find utility across a vast array of different computing devices and/or computing platforms and the intention is not to limit the scope of the present disclosure to a specific computing device and/or computing platform beyond any such limits that may be found in the appended claims.

Figure 2A:
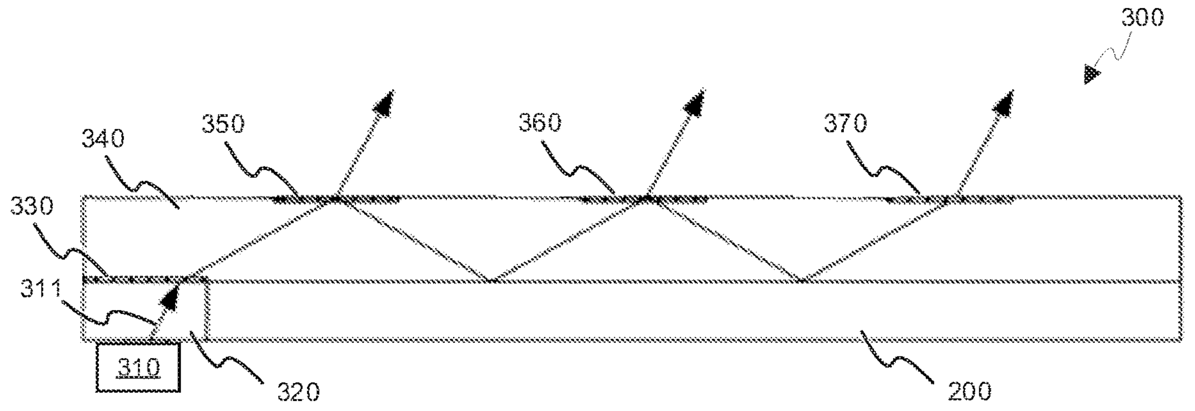
FIGS. 2A and 2B depict an embodiment of a display system comprising a display screen layer and optical device suitable for the optical device and display screen of FIG. 1.
Figure 2B:
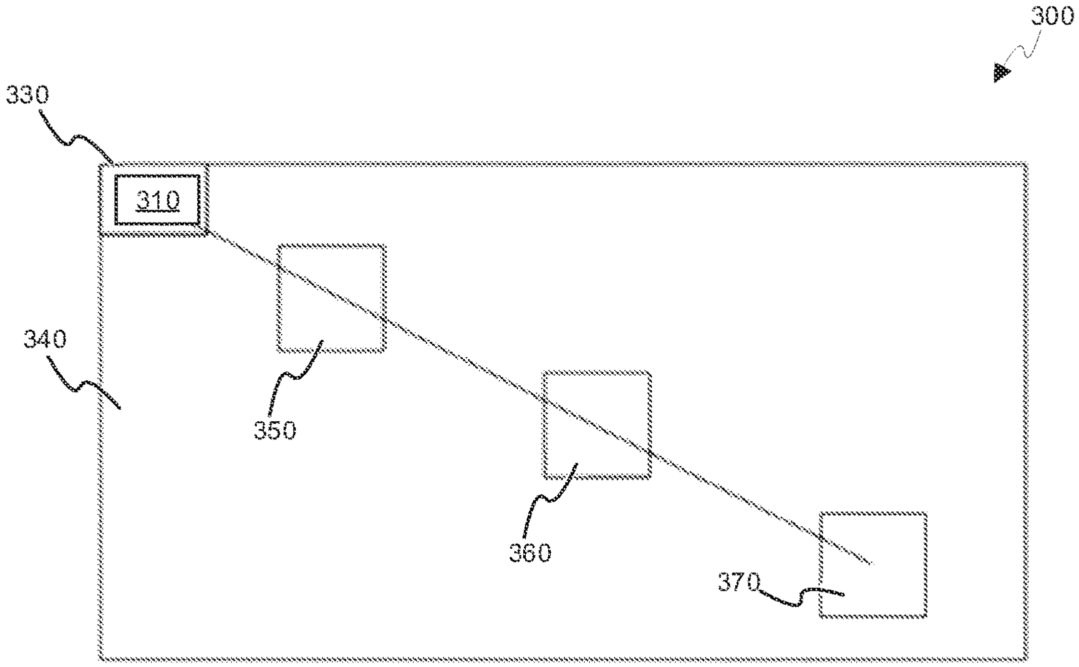

Referring now to FIGS. 2A and 2B, a display screen layer 200 and an optical device 300 are shown. In particular, FIG. 2A depicts a side view of the display screen layer 200 and the optical device 300 and FIG. 2B depicts a top view of the display screen layer 200 and the optical device 300. The optical device 300 may correspond to the optical device 140 of FIG. 1.

The display screen layer 200 may comprise a front surface, a back surface, and a sidewall between the front surface and the back surface. The display screen layer 200 may correspond to one or more layers of the display screen 130 and may present visual output via its front surface. For example, the display screen layer 200 may correspond to an OLED display layer, an LED display layer, a uLED display layer, a LCOS display layer, or another display layer of the display screen 130.

As shown, the optical device 300 may comprise an optical element such as transmitter 310, a coupling region 320, an optical coupler 330, a front upper guide 340, and optical couplers 350, 360, 370. The transmitter 310 may be positioned below or behind a back surface of the display screen layer 200. Moreover, the transmitter 310 may be aligned with the coupling region 320 and the optical coupler 330. In various embodiments, the optical device 300 may include more than one transmitter 310.

Multiple transmitters 310 may use the same optical layer or portions of the same optical layer from the front upper guide 340 to route beam 311 to respective optical couplers 350, 360, 370. In some embodiments, the optical device 300 may include separate optical layers for at least some of the transmitters 310.

The coupling region 320 may be positioned along a sidewall of the display screen layer 200, but other positions are possible. For example, the coupling region 320 may be positioned such that the coupling region 320 passes through the display screen layer 200 and not merely along an outer sidewall of the display screen layer 200. In general, the coupling region 320 may comprise an optically-transmissive material that permits passage of beam 311 from a back surface of the coupling region 320 to a front surface of the coupling region 320. The back surface of the coupling region 320 may be coplanar with the back surface of the display screen layer 200, and the front surface of the coupling region 320 may be coplanar with the front surface of the display screen layer 200. In various embodiments, the coupling region 320 may be integrated with the display screen layer 200 or the display screen 130 of the computing device 100.

The upper guide 340 may comprise an optical layer over the coupling regions 320 and the front surface of the display screen layer 200. In particular, the upper guide 340 may comprise one or more material layers, dielectric layers, coatings, etc. that extend at least partially along the display screen layer 200 and cooperate to route beam 311 from the transmitter 310 toward the optical couplers 350, 360, 370. Further, front and back surfaces of the upper guide 340 may be implemented to provide total internal reflection (TIR), which traps beam 311 within the upper guide 340, and routes the trapped beam 311 between the optical coupler 330 and the optical couplers 350, 360, 370. In various embodiments, the thickness of one or more optical layers of the upper guide 340 may be defined such that the upper guide 340 supports propagation of a discrete set of modes or continuum of modes. Further, in this and subsequent embodiments, the upper guide 340 and/or lower guide 342 (see, e.g., FIG. 5A) may be separated from the display screen layer 200 by an air gap, which may facilitate better confinement via TIR.

The optical coupler 330 may be formed in a back surface of the upper guide 340 and positioned over the coupling region 320. The optical coupler 330 may be constructed to permit a beam 311 emitted by the transmitter 310 to enter the back surface of the upper guide 340 via the coupling region 320.

The optical couplers 350, 360, 370 may comprise gratings and/or other structures that permit a beam 311 to escape the front surface of the upper guide 340. The optical couplers 350, 360, 370 may be designed to have different outcoupling efficiency to improve spatial uniformity of illumination of the optical device 300. For clarity, FIGS. 2A and 2B depict a single beam 311 generated by the transmitter 310. However, in various embodiments, the transmitter 320 may generate a number of beams within a certain field of view (FOV).

The optical device 300 may provide light transportation by coupling the beam 311 from the transmitter 310 into the back surface of the upper guide 340 via the optical coupler 330, propagating the trapped beam 311 within the upper guide 340 using total internal reflection (TIR) and/or reflective layer coatings of the upper guide 340, and emitting the beam 311 from the front surface of the upper guide 340 via one or more of the optical couplers 350, 360, 370. The optical coupler 330 and/or the optical couplers 350, 360, 370 may be prismatic couplers, diffractive couplers, metasurface couplers, or other types of couplers known in the art. The couplers 330, 350, 360, 370 may be embedded in one or more layers of the upper guide 340, etched into one or more layers of the upper guide 340, or mounted on a front surface, a back surface, or a sidewall of the upper guide 340. As such, the upper guide 340 may provide output coupling of the beam 311 out the front surface (as shown) or a sidewall of the upper guide 340. The optical couplers 350, 360, 370 may be designed to have multiple outcoupling or uncoupling regions. Multiple outcoupling or uncoupling regions may be useful, for example, to expand the spatial extent of the outcoupling area by outcoupling light on several light bounces within the upper guide 340.

The upper guide 340 may transport light to regions of the display screen 130 that may be optimal and/or preferred from a sensing perspective. Such regions may have been unavailable to conventional optical devices due to the fact that receivers and/or transmitters of such optical devices would interfere with viewing image output of the display screen layer 200. The couplers 350, 360, 370, however, may be designed to minimize interference with image output of the display screen layer 200 and the transmitter 310 may be placed at a location (e.g., behind the display screen layer 200) that does not interfere with image output. For example, by choosing an appropriate grating pitch and/or reducing an index contrast of the coupler 350, 360, 370, the couplers 350, 360, 370 may be placed on the display screen layer 200 without interfering or appreciably interfering with image output. Also, a sensing wavelength may be chosen to be shorter or longer than a wavelength range for visible light. The couplers 350, 360, 362, 370 may extend to cover a large portion of the upper guide 340 and/or display screen layer 200, or may be confined to discrete areas of the upper guide 340 and/or display screen layer 200 as shown.

The couplers 330, 350, 360, 370 may incorporate beam shaping features and/or aberration correction in addition to a coupling functions. For example, one or more of the couplers 330, 350, 360, 370 may be implemented as a grating coupler having curvilinear grooves and/or variable spacing. One or more of the couplers 330, 350, 360, 370 may also incorporate a beam splitting function. One or more of the couplers 330, 350, 360, 370 may also provide a polarization function, such as a linear polarizer or a waveplate. Such beam shaping, polarization functions, and/or other optical functions may be provided by one or more metasurfaces of the couplers 330, 350, 360, 370 and/or the upper guide 340. In some embodiments, optical elements may be incorporated into the upper guide 340. Such optical elements may provide beam shaping, polarization, and/or other optical functions.

If the optical coupler 330 and the optical couplers 350, 360, 370 are implemented as diffraction grating couplers having a same period, a resulting signal emitted by the optical device 300 should experience little to no distortion due to diffraction grating dispersion. However, if the period of the optical coupler 330 differs from the period(s) of the optical couplers 350, 360, 370, then the resulting signal emitted by the optical device 300 may experience image distortion due to mismatched dispersion of the optical coupler 330 and the optical couplers 350, 360, 370. Similarly, if the optical coupler 330 is implemented as prism coupler and the optical couplers 350, 360, 370 are implemented as grating couplers or vice versa, the resulting signal emitted by the optical device 300 may experience image distortion due to mismatched dispersion of the optical coupler 330 and optical couplers 350, 360, 370. As such, the optical device 300 may include other elements such as optical elements embedded in the upper guide 340 that compensate for such distortion. Alternatively and/or additionally, the computing device 100 may include software, which the processor 110 may execute to compensate for such distortion.

Further, as light propagates within the upper guide 340, the light may be allowed to expand or stay collimated within the upper guide 340. Beam expansion may increase a spatial extent of the signals emitted by the optical device 300. An increased spatial extent may improve a 3D sensing resolution of the optical device 300. Further, expanding the beam 311 may reduce energy per area of the expanded beam 311 and increase eye safety of the emitted beam 311. As such, total emission power of the expanded beam 311 may be increased in comparison to a non-expanded beam while maintaining a same eye safety threshold and increasing a 3D sensing range of the optical device 300.

For a transmitter 310 implemented as a dot projector, an important parameter is a distance between the light source apertures of the transmitter 210 and a collimating or focusing lens. The larger the distance, the smaller angular extent of the dot. A collimating function, however, may be incorporated in the optical couplers 350, 360, 370. As such, the distance between the light source apertures of the transmitter 310 and the collimating function may be increased. This may result in dramatic reduction of angular dot size compared to current approaches and may increase in 3D sensing resolution of the optical device 300.

Figure 3A:
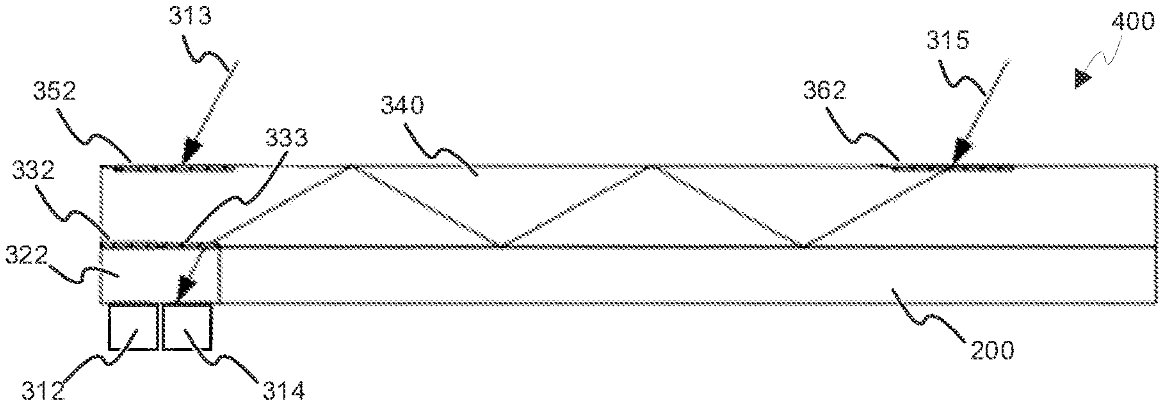
FIGS. 3A and 3B depict an embodiment of a display system comprising a display screen layer and optical device suitable for the optical device and display screen of FIG. 1.
Figure 3B:
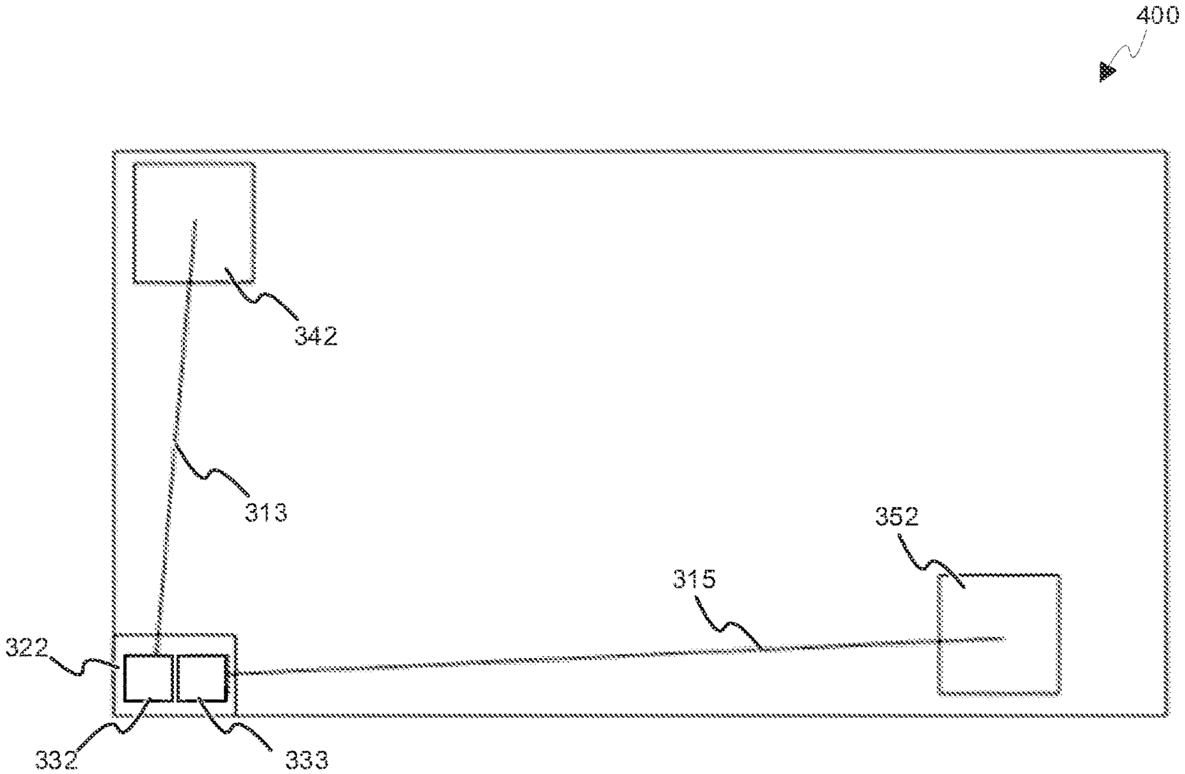

Referring now to FIGS. 3A and 3B, a display screen layer 200 and an optical device 400 are shown. In particular, FIG. 3A depicts a side view of the display screen layer 200 and the optical device 400 and FIG. 3B depicts a top view of the display screen layer 200 and the optical device 400. The display screen layer 200 may correspond to one or more layers of the display screen 130 and the optical device 400 may correspond to the optical device 140 of FIG. 1.

As shown, the optical device 400 may comprise one or more optical elements such as receivers 312, 314, a coupling region 322, an optical coupler 332, an upper guide 340, and optical couplers 352, 362. The receivers 312, 314 may be positioned below or behind a back surface of the display screen layer 200. Moreover, the receivers 312, 314 may be aligned with the coupling region 322 and the optical couplers 332, 333.

The coupling region 322 may be positioned along a sidewall of the display screen layer 200, but other positions are possible. In general, the coupling region 322 may comprise an optically-transmissive material that permits passage of beams 313, 315 from a front surface of the coupling region 322 to a back surface of the coupling region 322. The back surface of the coupling region 322 may be coplanar with the back surface of the display screen layer 200, and the front surface of the coupling region 322 may be coplanar with the front surface of the display screen layer 200. In various embodiments, the coupling region 322 may be integrated with the display screen layer 200 or the display screen 130 of the computing device 100. In general, the upper guide 340 may be implemented similar to the upper guide 340 of FIGS. 2A and 2B.

The optical device 400 may provide light transportation by coupling the beams 313, 315 into the upper guide 340 via optical couplers 352, 362, propagating the trapped beams 313, 315 within the upper guide 340 using total internal reflection (TIR) and/or reflective layer coatings of the upper guide 340, coupling the beams 313, 315 from the upper guide 340 to the coupling region 322 via the optical couplers 332, 333, propagating the beams 313, 315 through the coupling region 322 to the receivers 312, 314. In particular, the upper guide 340 may transport light from regions of the display screen 130 that may be optimal and/or preferred from a sensing perspective. Such regions may have been unavailable to conventional optical devices due to the fact that receivers and/or transmitters of such optical devices would interfere with viewing image output of the display screen layer 200. The couplers 352, 362, however, may be designed to minimize interference with image output of the display screen layer 200 and the transmitter 310 may be placed at a location (e.g., behind the display screen layer 200) that does not interfere with image output. As such, the couplers 352, 362 may be implemented similar to the couplers 350, 360, 370 of FIGS. 2A and 2B. Similarly, coupler 332 may be implemented similar to the coupler 330 of FIGS. 2A and 2B.

Figure 4A:
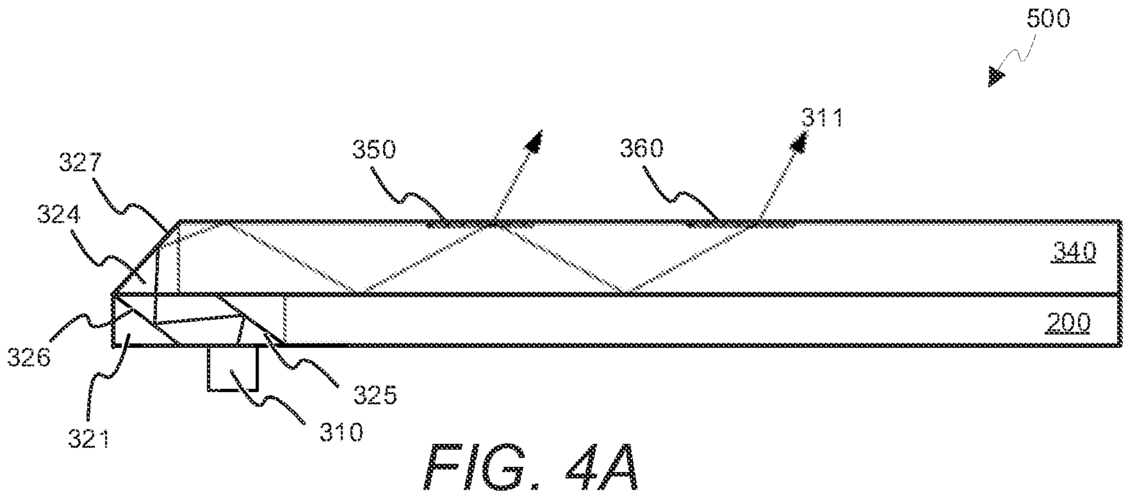
FIGS. 4A and 4B depict an embodiment of a display system comprising a display screen layer and optical device suitable for the optical device and display screen of FIG. 1.
Figure 4B:
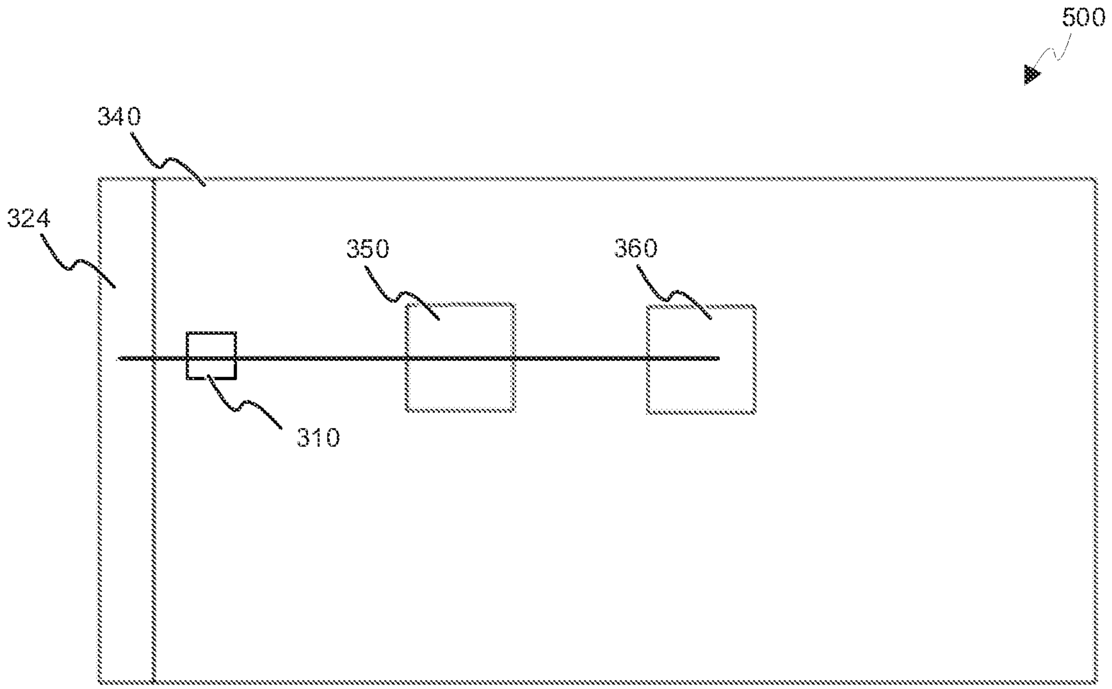

Referring now to FIGS. 4A and 4B, a display screen layer 200 and an optical device 500 are shown. In particular, FIG. 4A depicts a side view of the display screen layer 200 and the optical device 500 and FIG. 4B depicts a top view of the display screen layer 200 and the optical device 500. The display screen layer 200 may correspond to one or more layers of the display screen 130 and the optical device 500 may correspond to the optical device 140 of FIG. 1.

As shown, the optical device 500 may comprise a transmitter 310, a first coupling region 321, a second coupling region 324, mirrors 325, 326, 327, an upper guide 340, and optical couplers 350, 360. The transmitter 310 may be positioned below or behind a back surface of the display screen layer 200. Moreover, the transmitter 310 may be aligned with the first coupling region 321.

The first coupling region 321 may be positioned along a sidewall of the display screen layer 200, but other positions are possible. In general, the first coupling region 321 may comprise a first mirror 325, a second mirror 326, and an optically-transmissive material that permits passage of beam 311. In particular, the first mirror 325 and the second mirror 326 may be positioned and angled to receive the beam 311 from a back surface of the first coupling region 321 and direct the beam 311 around a sidewall of the display screen layer 200. To this end, the first mirror 325 and the second mirror 326 may be positioned beyond the sidewall of the display screen layer 200. The first mirror 325 may be angled to direct a beam 311 from the transmitter 310 toward the second mirror 327. The second mirror 326 may be angled to direct the beam 311 toward the second coupling region 324. The mirrors 325, 326 as well as mirror 327 described below may be based on metal reflectors, dielectric reflectors, or total internal reflection.

The back surface of the first coupling region 321 may be coplanar with the back surface of the display screen layer 200, and the front surface of the first coupling region 321 may be coplanar with the front surface of the display screen layer 200. In various embodiments, the first coupling region 321 may be integrated with the display screen layer 200 or the display screen 130 of the computing device 100.

The second coupling region 324 may comprise a third mirror 327 and an optically-transmissive material that permits passage of beam 311. In particular, the third mirror 327 may be positioned and angled to receive the beam 311 from a back surface of the second coupling region 324 and direct the beam 311 and in-couple the beam 311 to the upper guide 340 via a sidewall of the upper guide 340. To this end, the third mirror 327 may be positioned above the second mirror 326 of the first coupling region 321 and beyond the sidewall of the upper guide 340. The third mirror 327 may be angled to direct a beam 311 received from the second mirror 326 via a back surface of the second coupling region 324 toward the sidewall of the upper guide 340.

The second coupling region 324 may be positioned above the first coupling region 321. In particular, a back surface of the second coupling region 324 may be positioned over the front surface of the first coupling region 321. Moreover, the back surface of the second coupling region 324 may be coplanar with the front surface of the display screen layer 200. In various embodiments, the second coupling region 324 may be integrated with the display screen layer 200 or the display screen 130 of the computing device 100.

In general, the transmitter 310, couplers 330, 350, 360, and upper guide 340 of optical device 500 may be implemented similar to the transmitter 310, couplers 330, 350, 360, and upper guide 340 of the optical device 300 shown in FIGS. 2A and 2B. However, the coupling regions 321, 324 route the beam 311 such that the beam 311 enters the upper guide 340 via a sidewall of the upper guide 340 instead of via a back surface of the upper guide 340 as shown in FIG. 2A.

Per the above, the optical device 500 may provide light transportation by coupling the beam 311 into the upper guide 340 through coupling regions 321, 324 and a sidewall of the upper guide 340, propagating the trapped beam 311 within the upper guide 340 using total internal reflection (TIR) and/or reflective layer coatings of the upper guide 340, and emitting the beam 311 from the upper guide 340 via the optical couplers 350, 360. In particular, the upper guide 340 may emit beam 311 from regions of the display screen 130 that may be optimal and/or preferred from a sensing perspective. Such regions may have been unavailable to conventional optical devices due to the fact that receivers and/or transmitters of such optical devices would interfere with viewing image output of the display screen layer 200. The couplers 350, 360, however, may be designed to minimize interference with image output of the display screen layer 200 and the transmitter 310 may be placed at a location (e.g., behind the display screen layer 200) that does not interfere with image output.

Figure 5A:
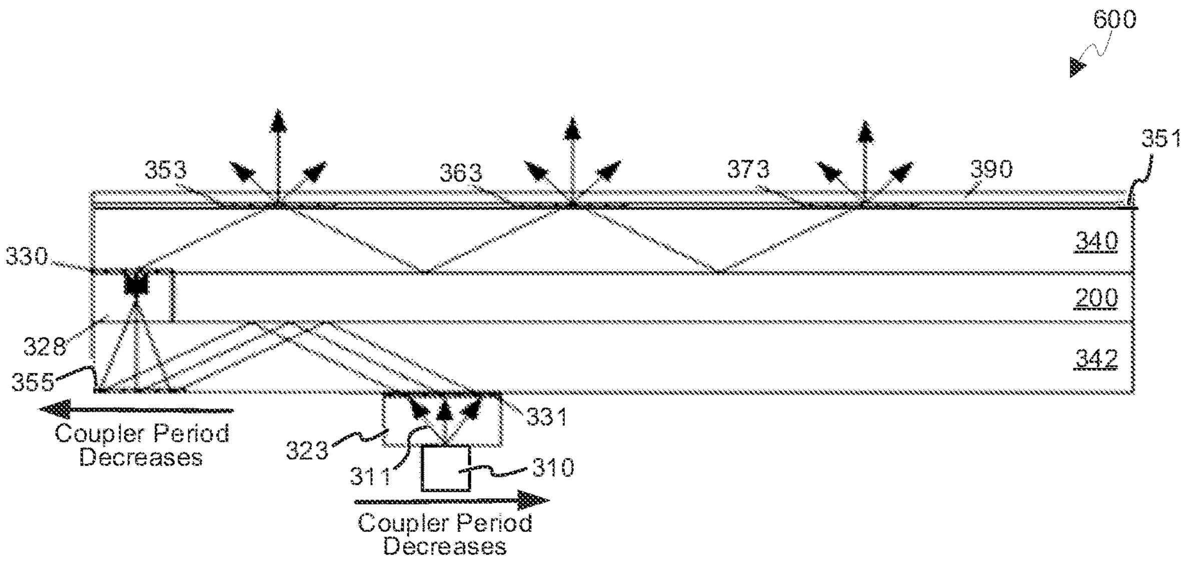
FIGS. 5A and 5B depict an embodiment of a display system comprising a display screen layer and optical device suitable for the optical device and display screen of FIG. 1.
Figure 5B:
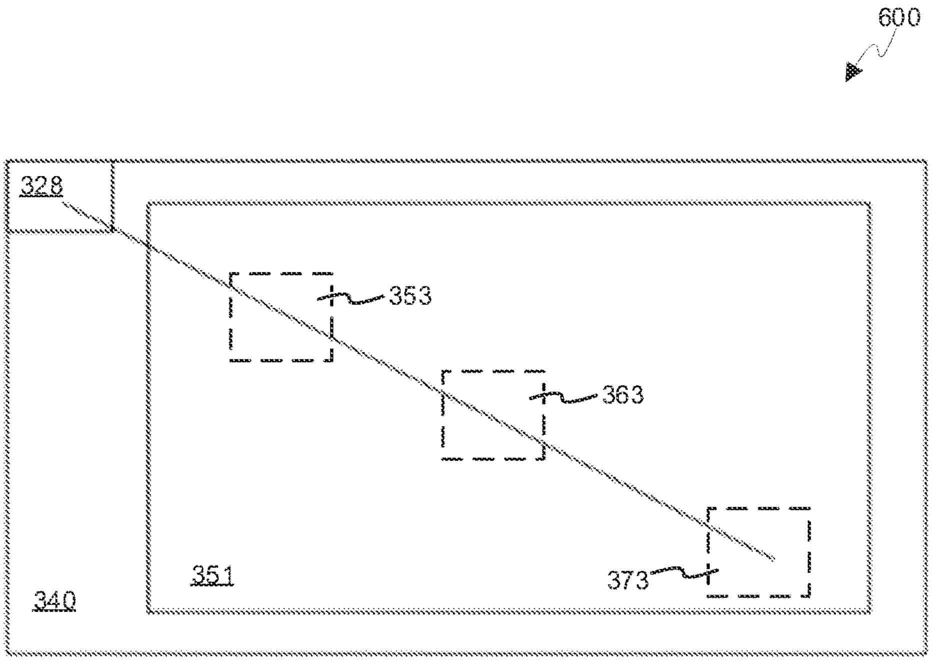

Referring now to FIGS. 5A and 5B, a display screen layer 200 and an optical device 600 are shown. In particular, FIG. 5A depicts a side view of the display screen layer 200 and the optical device 600 and FIG. 5B depicts a top view of the display screen layer 200 and the optical device 600. The display screen layer 200 may correspond to one or more layers of the display screen 130 and the optical device 600 may correspond to the optical device 140 of FIG. 1.

As shown, the optical device 600 may comprise a transmitter 310, coupling regions 323, 328, optical couplers 330, 331, guides 340, 342, optical couplers 351, 355, and a cover layer 390. The transmitter 310 may be positioned below and behind a back surface of the display screen layer 200. Moreover, the transmitter 310 may be positioned below and behind a back surface of the lower guide 342.

The upper guide 340 and the lower guide 342 may be implemented similar to the upper guide 340 of FIG. 2A. However, the lower guide 342 may comprise an optical layer over the first coupling region 323 and behind the display screen layer 200. In particular, the lower guide 342 may comprise one or more material layers, dielectric layers, coatings, etc. that extend along at least a portion of the display screen layer 200 and cooperate to route beam 311 from the transmitter 310 toward the coupling region 329. Further, front and back surfaces of the lower guide 342 may be implemented to provide total internal reflection (TIR), which traps beam 311 within the lower guide 342, routes the trapped beam 311 between the optical coupler 331 and the optical coupler 355. In various embodiments, the thickness of one or more optical layers of the lower guide 342 may be defined such that the lower guide 342 supports propagation of a discrete set of modes or continuum of modes. The lower guide 342 may be useful when the transmitter 310 for various reasons may not be mounted proximate a sidewall of the display screen layer 200.

The first coupling region 323 may be implemented similar to coupling region 320 of FIG. 2A, but positioned below the lower guide 342. In particular, the first coupling region 323 may be positioned between a back surface of the lower guide 342 and the transmitter 310 and behind the display screen layer 200, but other positions are possible. In general, the first coupling region 323 may comprise an optically-transmissive material that permits passage of a beam 311 received via a back surface of the first coupling region 323 to a front surface of the first coupling region 323.

The second coupling region 328 may be implemented similar to the coupling region 320 of FIG. 2A. In particular, the second coupling region 328 may be positioned along a sidewall of the display screen layer 200, but other positions are possible. In general, the second coupling region 328 may comprise an optically-transmissive material that permits passage of the beam 311 from a back surface of the second coupling region 328 to a front surface of the second coupling region 329. The back surface of the second coupling region 328 may be coplanar with the back surface of the display screen layer 200, and the front surface of the second coupling region 328 may be coplanar with the front surface of the display screen layer 200. In various embodiments, the second coupling region 328 may be integrated with the display screen layer 200 or the display screen 130 of the computing device 100.

The couplers 331, 355 may be formed in a back surface of the lower guide 342. In particular, the optical coupler 331 may be positioned over the first coupling region 323 and optical coupler 355 may be positioned below the second coupling region 328. The optical coupler 331 may be constructed to permit a beam 311 emitted by the transmitter 310 to enter the back surface of the lower guide 342 via the first coupling region 323. Conversely, the optical coupler 355 may be constructed to permit the beam 311 to exit the front surface of the lower guide 342 via the second coupling region 328.

The cover layer 390 may comprise a layer of transparent material that covers the upper guide 340. The cover layer 390 may protect optical coupler 351 from contamination. Moreover, the cover layer 390 may increase reflectivity of an interface between the upper guide 340 and an external environment (e.g., air) in which the optical device 600 operates.

In general, the transmitter 310, couplers 330, 331, 351, 355, and guides 340, 342 of optical device 600 may be implemented similar to the transmitter 310, couplers 330, 350, 360, and upper guide 340 of FIGS. 2A and 2B. In particular, the optical coupler 351 may be implemented as a contiguous region that may cover most or all of the display screen layer 200. The optical coupler 351 may comprise output areas 353, 363, 373 from which the beam 311 escapes the upper guide 340. Moreover, the optical coupler 351 and its output areas 353, 363, 373 may be designed to produce a continuous stitched output. The optical couplers of the other disclosed optical devices (e.g., couplers 350, 360, 370 of optical device 300) may similarly be implemented as a contiguous region that covers most or all of the display screen layer 200.

Per the above, the optical device 600 may provide light transportation by coupling the beam 311 into the lower guide 342 via first coupling region 323 and optical coupler 331, propagating the trapped beam 311 within the lower guide 342 using total internal reflection (TIR) and/or reflective layer coatings of the lower guide 342, coupling the beam 311 into the second coupling region 328 via optical coupler 355, coupling the beam 311 into the upper guide 340 via second coupling region 328 and optical coupler 330, propagating the trapped beam 311 within the upper guide 340, and emitting the beam 311 from the upper guide 340 via the optical coupler 351 and its output areas 353, 363, 373.

In FIG. 5A, the transmitter 310 is depicted as emitting a beam 311 having three rays. Such rays are also shown in coupling regions 323, 328 and lower guide 342. Moreover, such rays are depicted as exiting the upper guide 340 via output areas 353, 363, and 373 of optical coupler 351. Such rays generally represent an initial field of illumination from the transmitter 310 and further represent that the optical device 600 may be implemented such that the beam 311 preserves the field of illumination as it exits the upper guide 340.

To this end, the couplers 331 and 355 may be implemented as grating couplers or metasurface couplers that have variable line spacing. The couplers 331, 355 may introduce focusing, collimating, or other optical power functions so that a range of angles originating from transmitter 310 emerge as a set of rays with different divergence. The grating contours of the couplers 331, 355 may be curvilinear to provide an optical function in the orthogonal direction. In particular, the coupler 331 may produce a set of parallel rays and the coupler 355 may have an opposite variable line spacing, so that after passing through both couplers 331, 355 the beam 311 forms a light cone with zero total angular dispersion on the gratings. Further, a focusing function of couplers 331, 355 may aid in reducing the lateral dimensions of the second coupling region 328 at the sidewall of the display screen layer 200. As of result of reducing or minimizing the lateral dimensions of the second coupling region 328, an opening in the display screen layer 200 to accommodate the optical device 600 may be reduced and/or lateral dimensions of the display screen layer 200 may be increased.

Figure 6A:
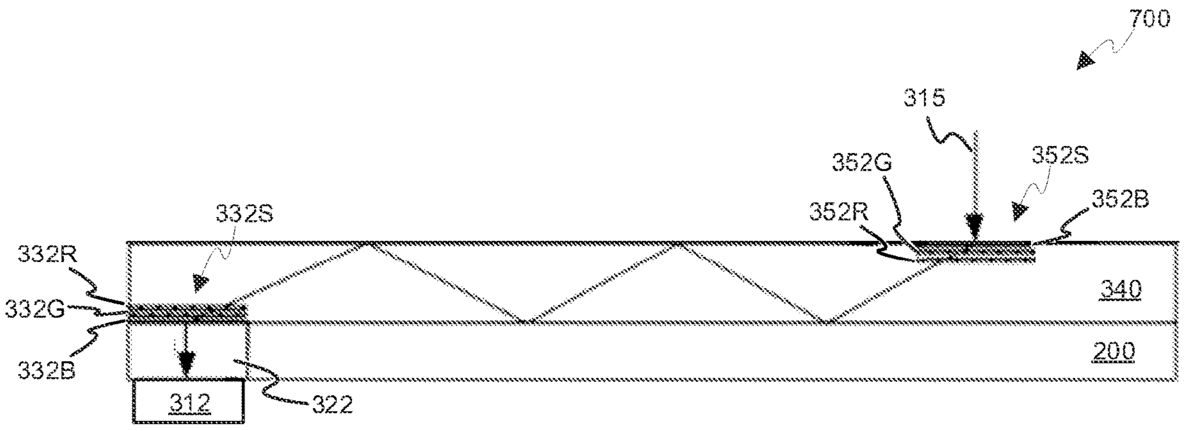
FIGS. 6A and 6B depict an embodiment of a display system comprising a display screen layer and optical device suitable for the optical device and display screen of FIG. 1.
Figure 6B:
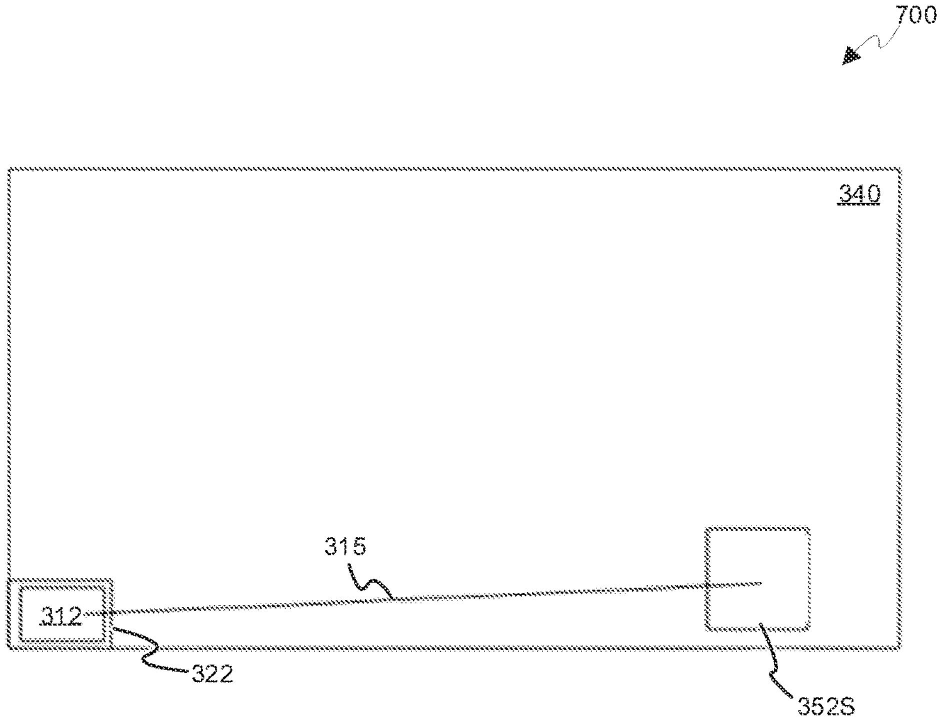

Referring now to FIGS. 6A and 6B, a display screen layer 200 and an optical device 700 are shown. In particular, FIG. 6A depicts a side view of the display screen layer 200 and the optical device 700 and FIG. 6B depicts a top view of the display screen layer 200 and the optical device 700. The display screen layer 200 may correspond to one or more layers of the display screen 130 and the optical device 700 may correspond to the optical device 140 of FIG. 1.

In general, the optical device 700 may be implemented similar to the optical device 400 shown in FIGS. 3A and 3B. However, unlike the optical device 400, the optical device 700 comprises a multiband stack 352S. In particular, the optical device 700 may comprise one or more receivers 312, a coupling region 322, one or more multiband stacks 332S, an upper guide 340, and the multiband stack 352S. The one or more receivers 312 may be positioned below or behind a back surface of the display screen layer 200. Moreover, the one or more receivers 312 may be aligned with the coupling region 322 and the multiband 332S.

The coupling region 322 may be positioned at a sidewall of the display screen layer 200, but other positions are possible. In general, the coupling region 322 may comprise an optically-transmissive material that permits passage of a beam 315 from a front surface of the coupling region 322 to a back surface of the coupling region 322. The back surface of the coupling region 322 may be coplanar with the back surface of the display screen layer 200, and the front surface of the coupling region 322 may be coplanar with the front surface of the display screen layer 200. In various embodiments, the coupling region 322 may be integrated with the display screen layer 200 or the display screen 130 of the computing device 100. In general, the upper guide 340 may be implemented similar to the upper guide 340 of FIG. 3A.

The optical device 700 may provide light transportation by coupling the beam 315 into the upper guide 340 via optical couplers 352R, 352B, 352G of the multiband stack 352S, propagating the trapped beam 315 within the upper guide 340 using total internal reflection (TIR) and/or reflective layer coatings of the upper guide 340, and emitting the beam 315 from the upper guide 340 via the optical couplers 332R, 332B, 332G of the multiband stack 332S. In particular, the upper guide 340 may transport light from regions of the display screen 130 that may be optimal and/or preferred from a sensing perspective.

To this end, each optical coupler 332R, 332G, 332B and each optical coupler 352R, 352B, 352G may have a narrow passband within an overall operating band. In particular, first waveband (e.g., red) couplers 332R, 352R may be configured to pass a first waveband (e.g., red), second waveband (e.g., green) couplers 332G, 352G may be configured to pass a second waveband (e.g., green), and third waveband (e.g., blue) couplers 332B, 352B may be configured to pass a third waveband (e.g., blue). As shown, the waveband couplers 332R, 332G, 332B may be stacked such that the first waveband (e.g., red) coupler 352R is at the top of the multiband stack 332S, the third waveband (e.g., blue) coupler 332B is at the bottom of the multiband stack 332S, and the second waveband (e.g., green) coupler 332G is in the middle of the multiband stack 332S. Conversely, the waveband couplers 352R, 352G, 352B may be stacked such that the first waveband (e.g., red) coupler 352R is at the bottom of the multiband stack 352S, the third waveband (e.g., blue) coupler 352B is at the top of the multiband stack 352S, and the second waveband (e.g., green) coupler 352G is in the middle of the multiband stack 352S.

As depicted in FIG. 6A, the optical device 700 may support three different wavebands (e.g., red, green, blue). However, the optical device 700 may be implemented with an arbitrary number of wavebands by using an appropriate number of waveband couplers in the upper multiband stack 352S and a corresponding number of waveband couplers in the lower multiband stack 332S.

In an example embodiment of the optical device 700, the upper guide 340 comprises a high refractive index glass and its front surface interfaces with the external environment (e.g., air). An input angle of the beam 315 may be normal or nearly normal to the front surface of the upper guide 340. A grating coupler period for the first waveband (e.g., red) couplers 332R, 352R may be 349 nm to appropriately couple a first waveband (e.g., red) of the beam 315, which is centered at 530 nm. A grating coupler period for the second waveband (e.g., green) couplers 332G, 352G may be 300 nm to appropriately couple a second waveband (e.g., green) of the beam 315, which is centered at 530 nm. A grating coupler period for the third waveband (e.g., blue) couplers 332B, 352B may be 263 nm to appropriately couple a third waveband (e.g., blue) of the beam 315, which is centered at 465 nm.

Based on the above configuration, each of the waveband couplers 352R, 352G, 352B may couple their respective wavebands (e.g., red, blue, green) of the beam 315 into the upper guide 340 at an approximately 62° angle to normal. Maintaining the same coupling angle may be desirable to avoid walk-off of the beam 315, especially when using a single receiver 312. The chosen grating parameters of the waveband couplers 352R, 352G, 352B may permit passage of the respective waveband without diffraction, namely the first waveband (e.g., red) and the second waveband (e.g., green) pass through the third waveband (e.g., blue) coupler 352B without diffraction, and the first waveband (e.g., red) passes through the second waveband (e.g., green) coupler 352G without diffraction. However, the underlying waveband couplers 352R, 352G may still interact (e.g., diffract) with wavebands after being deflected by the respective waveband couplers 332B, 332G. For example, the underlying first and second waveband (e.g., red and green) couplers 352R, 352G may diffract the third waveband (e.g., blue), which was deflected by the third waveband (e.g., blue) coupler 352B. Such additional diffraction may be minimized by blazing the grating of the waveband couplers 352R, 352G, 352B, such as by using holographic couplers, which may make the waveband couplers 352R, 352G, 352B selective to only a specific combination of wavelength, input angle, and output angle.

Figure 7:
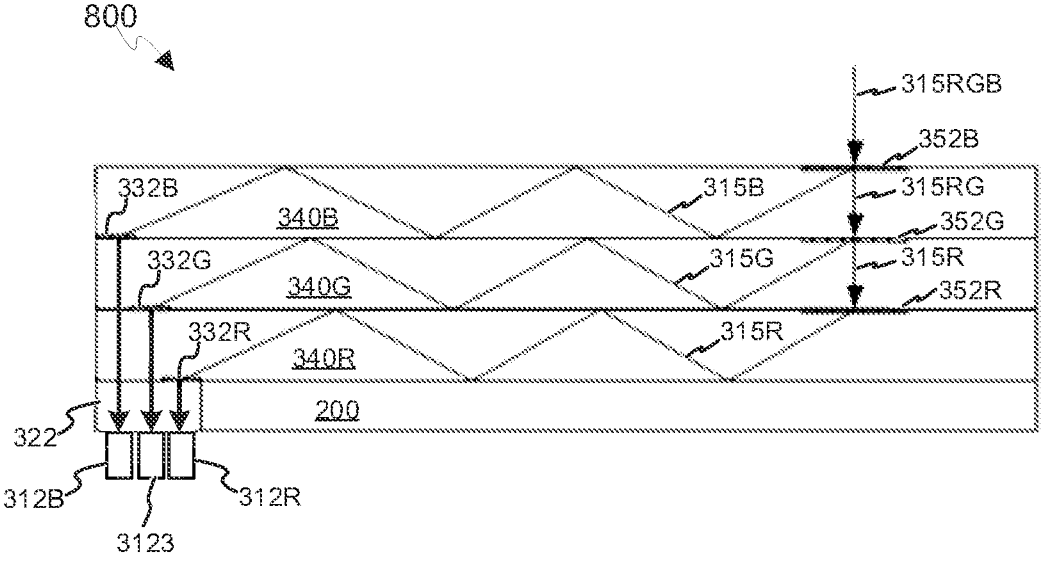
FIG. 7 depicts an embodiment of a display system comprising a display screen layer and optical device suitable for the optical device and display screen of FIG. 1.

To avoid this additional diffraction, an optical device 800 may include a separate guide for each waveband. Referring now to FIG. 7, a side view of a display screen layer 200 and an optical device 800 is provided. The display screen layer 200 may correspond to one or more layers of the display screen 130 and the optical device 800 may correspond to the optical device 140 of FIG. 1.

In general, the optical device 800 may be implemented similar to the optical device 700 shown in FIGS. 6A and 6B. However, unlike the optical device 700, the optical device 800 comprises a first waveband (e.g., red) guide 340R for a first waveband (e.g., red), a second waveband (e.g., green) guide 340G for a second waveband (e.g., green), and a third waveband (e.g., blue) guide 340B for a third waveband (e.g., blue). Moreover, the waveband couplers 332R, 332G, 332B may be laterally separated from one another. Such separation may prevent beams deflected by the respective waveband couplers 332B, 332G from being diffracted by underlying waveband couplers 332G, 332R.

Further, the optical device 800 may comprise a separate waveband receiver 312R, 312B, 312G for each of the wavebands, a coupling region 322, waveband couplers 332R, 332G, 332B, waveband guides 340R, 340G, 340B, and the waveband couplers 352R, 352G, 352B. The waveband receivers 312R, 312G, 312B may be positioned below or behind a back surface of the display screen layer 200. Moreover, the waveband receivers 312R, 312G, 312B may be aligned with the coupling region 322 and a respective waveband coupler 332R, 332G, 332B to receive the respective waveband beam 315R, 315G, 315B.

The coupling region 322 may be positioned along a sidewall of the display screen layer 200, but other positions are possible. In general, the coupling region 322 may comprise an optically-transmissive material that permits passage of waveband beams 315R, 315G, 315B between a front surface of the coupling region 322 and a back surface of the coupling region 322. The back surface of the coupling region 322 may be coplanar with the back surface of the display screen layer 200, and the front surface of the coupling region 322 may be coplanar with the front surface of the display screen layer 200. In various embodiments, the coupling region 322 may be integrated with the display screen layer 200 or the display screen 130 of the computing device 100.

In general, each of the waveband guides 340R, 340G, 340B may be implemented similar to the upper guide 340 of FIG. 3A. In particular, a first waveband (e.g., red) guide 340R may be positioned over the coupling region 322 and the display screen layer 200. A second waveband (e.g., green) guide 340G may be positioned over the coupling region 322, the display screen layer 200, and the first waveband guide 340R. A third waveband (e.g., blue) guide 340B may be positioned over the coupling region 322, the display screen layer 200, the first waveband guide 340R, and the second waveband guide 340G.

The optical device 700 may provide light transportation by respectively coupling a first waveband (e.g., red) beam 315R, a second waveband (e.g., green) beam 315G, and a third waveband (e.g., blue) beam 315B into the first waveband guide 340R, the second waveband guide 340G, and the third waveband guide 340B via respective waveband couplers 352R, 352G, 352B, propagating the trapped waveband beams 315R, 315G, 315B within the respective waveband guide 340R, 340G, 340B using total internal reflection (TIR) and/or reflective layer coatings of the respective waveband guide 340R, 340G, 340B, and emitting the waveband beam 315R, 315G, 315B from the respective waveband guide 340R, 340G, 340B via the waveband couplers 332R, 332B, 332G.

To this end, each waveband coupler 332R, 332G, 332B and each waveband coupler 352R, 352B, 352G may have a narrow passband within an overall operating band. In particular, the first waveband (e.g., red) couplers 332R, 352R may be configured to pass light in a first waveband (e.g., red), the second waveband (e.g., green) couplers 332G, 352G may be configured to pass light in a second waveband (e.g., green), and the third waveband (e.g., blue) couplers 332B, 352B may be configured to pass light in a third waveband (e.g., blue). Moreover, as shown, the waveband couplers 332R, 332G, 332B may be offset from one another such that light from one waveband coupler (e.g., 332R or 332G) does not pass through an underlying waveband coupler (e.g., 332G or 332B). In this manner, the optical device 800 may avoid the additional diffraction introduced by the waveband couplers 332G, 332B of the optical device 700 shown in FIGS. 6A and 6B.

Multiband optical devices 700, 800 are depicted as receiving outside signals and sensing such outside signals with one or more receivers. Multiband optical devices, which transmit signals, may be implemented in a similar manner. In particular, transmitters 310 may be added and beam paths reversed so as to emit multiband signals.

Moreover, the optical device 300, 400, 500, 600, 700, 800 possess various described features. Additional optical device embodiments may mix, match, and/or otherwise combine features from the optical devices 300, 400, 500, 600, 700, 800. For example, optical devices 300, 400 may be combined to form an optical device having both receive and transmit capabilities. Moreover, combined embodiments may share common elements. For example, the optical device 300 and the optical device 400 may be combined to form an optical device having a single upper guide 340 that is used to guide a beam 311 from the transmitter 310 and to guide a beam 315 to the receiver 312.

The present disclosure includes reference to certain examples, however, it will be understood by those skilled in the art that various changes may be made and equivalents may be substituted without departing from the scope of the disclosure. In addition, modifications may be made to the disclosed examples without departing from the scope of the present disclosure. Therefore, it is intended that the present disclosure not be limited to the examples disclosed, but that the disclosure will include all examples falling within the scope of the appended claims.

What is claimed is:

1. A display system, comprising:

a display screen layer comprising a front surface, a back surface, and a sidewall between the front surface, and the back surface, wherein the display screen layer is configured to present visual output via the front surface;

a coupling region through the display screen layer;

an upper guide that extends along at least a portion of the front surface of the display screen layer, wherein the upper guide comprises a front surface, a back surface, and a sidewall between the front surface and the back surface;

a first coupler along the front surface of the upper guide, wherein the first coupler couples a first beam through the front surface of the upper guide;

a second coupler between the coupling region and the upper guide;

a third coupler along the front surface of the upper guide; and an optical element below the back surface of the upper guide;

wherein the first coupler is configured to couple the first beam from an external environment into the upper guide via the front surface of the upper guide;

wherein the third coupler is configured to couple a second beam from the external environment into the upper guide via the front surface of the upper guide;

wherein the upper guide is configured to route the first beam between the first coupler and the second coupler and route the second beam between the third coupler and the second coupler;

wherein the second coupler is configured to couple the first beam and the second beam from the upper guide to the coupling region;

wherein the coupling region is configured to route the first beam and the second beam between the optical element and the upper guide; and wherein the optical element comprises a first receiver configured to receive the first beam from the coupling region and a second receiver configured to receive the second beam from the coupling region.

2. The display system of claim 1, comprising:

a lower guide that extends along at least a portion of the back surface of the display screen layer;

wherein the lower guide comprises a front surface, a back surface, and a sidewall between the front surface and the back surface; and wherein the lower guide is configured to route the first beam and the second beam between the coupling region and the optical element.

3. The display system of claim 1, comprising:

a first multiband stack along the front surface of the upper guide, wherein the first multiband stack includes the first coupler; and a second multiband stack between the upper guide and the coupling region, wherein the second multiband stack includes the second coupler.

4. The display system of claim 1, comprising:

a first multiband stack along the front surface of the upper guide, and wherein the first multiband stack includes the first coupler.

5. The display system of claim 4, comprising:

a second multiband stack between the upper guide and the coupling region, and wherein the second multiband stack includes the second coupler.

6. A display system, comprising:

a display screen layer comprising a front surface, a back surface, and a sidewall between the front surface, and the back surface, wherein the display screen layer is configured to present visual output via the front surface;

a coupling region through the display screen layer;

a first guide that extends along at least a portion of the front surface of the display screen layer, wherein the first guide comprises a front surface, a back surface, and a sidewall between the front surface and the back surface;

a second guide that extends along at least a portion of the front surface of the first guide; and a first coupler along the front surface of the first guide, wherein the first coupler couples a beam through the front surface of the first guide;

a second coupler between the coupling region and the first guide, wherein the second coupler couples the beam between the coupling region and the first guide;

a third coupler along the front surface of the second guide; and an optical element below the back surface of the first guide;

wherein the first guide is configured to route the beam between the first coupler and the second coupler;

wherein the coupling region is configured to route the beam between the optical element and the first guide;

wherein the first coupler couples a first waveband of the beam through the front surface of the first guide; and wherein the third coupler couples a second waveband of the beam through the front surface of the second guide.

7. The display system of claim 6, wherein:

the first coupler is configured to couple the beam from an external environment into the first guide via the front surface of the first guide; and the second coupler is configured to couple the beam from the first guide to the coupling region; and the optical element comprises a receiver configured to receive the beam via the coupling region.

8. The display system of claim 6, wherein the optical element comprises a receiver configured to receive the beam via the coupling region.

9. The display system of claim 6, wherein the optical element comprises a first receiver configured to receive the first waveband of the beam via the coupling region and a second receiver configured to receive the second waveband of the beam via the coupling region.

10. The display system of claim 6, wherein the third coupler is configured to couple the beam from an external environment into the second guide via the front surface of the second guide.

11. A display system, comprising:

a display screen layer comprising a front surface, a back surface, and a sidewall between the front surface, and the back surface, wherein the display screen layer is configured to present visual output via the front surface;

a coupling region through the display screen layer;

a first guide that extends along at least a portion of the front surface of the display screen layer, wherein the first guide comprises a front surface, a back surface, and a sidewall between the front surface and the back surface;

a second guide that extends along at least a portion of the front surface of the first guide;

a first coupler along the front surface of the first guide, wherein the first coupler couples a beam through the front surface of the first guide;

a second coupler between the coupling region and the first guide, wherein the second coupler couples the beam between the coupling region and the first guide;

a third coupler over the coupling region and laterally offset from the second coupler; and an optical element below the back surface of the first guide;

wherein the first guide is configured to route the beam between the first coupler and the second coupler;

wherein the coupling region is configured to route the beam between the optical element and the first guide;

wherein the second coupler couples a first waveband of the beam between the first guide and the coupling region; and wherein the third coupler couples a second waveband of the beam between the second guide and the coupling region.

12. The display system of claim 11, wherein the optical element comprises a receiver configured to receive the beam via the coupling region.

13. The display system of claim 11, wherein the optical element comprises a first receiver configured to receive the first waveband of the beam via the coupling region and a second receiver configured to receive the second waveband of the beam via the coupling region.

14. The display system of claim 11, comprising:

a fourth coupler along the front surface of the second guide, and wherein the fourth coupler is configured to couple the beam from an external environment into the second guide via the front surface of the second guide.

15. A computing device, comprising:

a display screen layer comprising a front surface, a back surface, and a sidewall between the front surface, and the back surface;

a storage device comprising instructions;

a processor configured to execute the instructions, wherein execution of the instructions causes the processor to present visual output via the front surface of the display screen layer;

a coupling region along the sidewall of the display screen layer;

a first guide that extends along at least a portion of the front surface of the display screen layer, wherein the first guide comprises a front surface, a back surface, and a sidewall between the front surface and the back surface;

a second guide that extends along at least a portion of the front surface of the first guide;

a first coupler along the front surface of the first guide, wherein the first coupler couples a beam through the front surface of the first guide;

a second coupler between the coupling region and the first guide, wherein the second coupler couples the beam between the coupling region and the first guide;

a third coupler along the front surface of the second guide; and an optical element below the back surface of the first guide;

wherein the first guide is configured to route the beam between the first coupler and the second coupler;

wherein the coupling region is configured to route first beam between the optical element and the first guide;

wherein the first coupler couples a first waveband of the beam through the front surface of the first guide; and wherein the third coupler couples a second waveband of the beam through the front surface of the second guide.

16. The computing device of claim 15, wherein the optical element comprises a receiver configured to receive the beam via the coupling region.

17. The computing device of claim 15, wherein the optical element comprises a first receiver configured to receive the first waveband of the beam from the coupling region and a second receiver configured to receive the second waveband of the beam via the coupling region.

18. A computing device, comprising:

a display screen layer comprising a front surface, a back surface, and a sidewall between the front surface, and the back surface;

a storage device comprising instructions;

a processor configured to execute the instructions, wherein execution of the instructions causes the processor to present visual output via the front surface of the display screen layer;

a coupling region along the sidewall of the display screen layer;

a first guide that extends along at least a portion of the front surface of the display screen layer, wherein the first guide comprises a front surface, a back surface, and a sidewall between the front surface and the back surface;

a second guide that extends along at least a portion of the front surface of the first guide; and a first coupler along the front surface of the first guide, wherein the first coupler couples a beam through the front surface of the first guide;

a second coupler between the coupling region and the first guide, wherein the second coupler couples the beam between the coupling region and the first guide;

a third coupler over the coupling region and laterally offset from the second coupler;

an optical element below the back surface of the first guide; and wherein the first guide is configured to route a first waveband of the beam between the first coupler and the second coupler;

wherein the second coupler couples a first waveband of the beam between the first guide and the coupling region; and wherein the third coupler couples a second waveband of the beam between the second guide and the coupling region; and wherein the coupling region is configured to route the beam between the optical element and the first guide.

19. The computing device of claim 18, wherein the optical element comprises a receiver configured to receive the beam via the coupling region.

20. The computing device of claim 18, wherein the optical element comprises a first receiver configured to receive the first waveband of the beam from the coupling region via the coupling region and a second receiver configured to receive the second waveband of the beam via the coupling region.

* * * * *